3,808,167
IMPREGNATING RESINS
Harro Petersen, Frankenthal, and Bernhard Magerkurth, Otto Froede, and Ludwig Lelgemann, Ludwigshafen, Germany, assignors to Badische Anilin- & Soda-Fabrik Aktiengesellschaft, Ludwigshafen (Rhine), Germany
No Drawing. Filed Apr. 12, 1972, Ser. No. 243,453
Claims priority, application Germany, Apr. 15, 1971,
P 21 18 284.3
Int. Cl. C08g 9/24
U.S. Cl. 260—30.6 R
3 Claims

ABSTRACT OF THE DISCLOSURE

Melamine/formaldehyde impregnating resins, suitable for example for the manufacture of laminates and coated wood materials, containing a substituted propionamide, e.g. 3-butoxy- or 3-thioethyl-propionamide, to improve their flow, and a process for their manufacture.

---

Aqueous or aqueous alcoholic solutions of melamine/formaldehyde precondensates, also referred to below as melamine resins for the sake of brevity, are suitable for impregnating absorbent substrate materials such as webs of paper and woven or non-woven fabrics, which after drying are hot-pressed to form laminates, and they are also suitable for improving the surfaces of wood materials, for example hardboard or chipboard. In this way it is possible to produce hard, scratch-resistant and water- and chemical-resistant surfaces showing excellent brilliance and clarity of color as is particularly desirable in the furniture industry. Melamine-resin-bonded surface coatings such as worktops in kitchens, canteens, etc., are extensively known as "plastics surfaces."

However, substrate materials which have been impregnated with pure melamine resins are difficult to process, particularly in the surface-finishing of wood materials of relatively low density such as chipboard. Since only low pressures in the range of up to 20 kg./cm.² may be applied, the resins—though still thermoplastically deformable—often show insufficient flow and the resulting surfaces are uneven, rich in pores and frequently crack when subsequently subjected to high temperatures.

It has been proposed to improve the flow of melamine resins by the addition of toluenesulfonamide, lactams, polyhydric alcohols, acetals and the like. The flow properties are also obviously governed by other factors such as the degree of condensation of the resin, the type of substrate material used, and the processing conditions.

In view of the wide variety of factors influencing the flow of melamine resins, it is desirable to find new means of improving the impregnating properties of resin solutions, the flowability of melamine resins and the gloss, hardness, solidity (absence of pores), the resistance to water, chemicals and heat, and other properties of surface coatings produced with these melamine resins.

We have found that this object is achieved with the formation of desirable and superior impregnating resins based on precondensates of melamine and formaldehyde by condensing, in known manner, melamine and formaldehyde in molar ratios of from 1:16 to 1:6 with or without conventional additives in minor quantities in aqueous solution and adding, just prior to the completion of condensation or subsequently thereto, from 1 to 20% by weight (based on the solids content of the aqueous solution) of a propionamide derivative which is soluble in the aqueous impregnating resin solution and has the general formula:

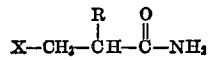

in which X stands for alkoxy, alkenoxy, alkylthio, alkenylthio or dialkylphosphono, the alkyl or alkenyl radicals in X having from 1 to 5 carbon atoms, and in which R denotes hydrogen or methyl.

Propionamide derivatives of the above kind, in which one or both of the hydrogen atoms attached to the amide nitrogen atom are substituted by alkyl of 1 or 2 carbon atoms, methylol or methylol ether (the etherifying alcohol having 1 to 5 carbon atoms), are equally effective in our invention and may be regarded as equivalents to the propionamide derivatives defined above.

The propionamide derivatives used in the present invention may be prepared by known methods, for example by the addition of alcohols, mercaptans or dialkyl phosphites to α,β-unsaturated carboxylic acid amides.

For example, the addition of saturated or unsaturated alcohols, mercaptans or dialkyl phosphites to acrylamide or methacrylamide provides compounds of value for the present invention, for example 3 - methoxypropionamide, 3 - butoxy - 2 - methylpropionamide, 3-thioethylpropionamide, dipropylphosphono-2-methylpropionamide.

Compounds of this kind retain or improve their activity for the purposes of the invention when one or both of the hydrogens attached to the amide nitrogen are substituted by an alkyl radical of 1 or 2 carbon atoms or are replaced by methylol or methoxyalkyl groups by reaction with formaldehyde, optionally followed by etherification with an alcohol of from 1 to 5 carbon atoms.

Another characteristic of the propionamide derivatives active in the present invention is their solubility in water or in the aqueous melamine resin solution. Their solubility should be at least sufficient to allow a quantity of from 1 to 20% of propionamide derivative, based on the resin content of the solution, to be added in dissolved form to the said solution.

Suitable melamine formaldehyde precondensate solutions, to which the above propionamides may be added either just before completion of the polycondensation or following the completion of said polycondensation, may be prepared by usual methods such as are described in Ullmann's Enzyklopädie der technischen Chemie, vol. 3, 3rd edition, pp. 485 to 492, or any other handbook relating to the art, at molar ratios of melamine to formaldehyde ranging from 1:1.6 to 1:6 and in particular from 1:1.6 to 1:3.0.

In addition to melamine and formaldehyde, the reaction mixture may contain minor quantities, for example up to 20%, of other amino resin-forming materials such as urea, urea derivatives, triazines, toluensulfonamides, other reactive compounds such as mono- or polyhydric alcohols, amines, water-soluble lactams, aliphatic and aromatic aldehydes or acetals and, if desired, conventional additives such as dyes.

The melamine, formaldehyde and, if used, additional materials as stated above are condensed in such quantities that aqueous resin solutions having a solids content of from 30 to 70% and preferably from 50 to 60% are obtained.

The degree of condensation of the resins is conveniently characterized by the water dilutability, also referred to as the water compatibility, of the resin solutions, a peculiarity of the chemistry of amino resins and phenolic resins. Water dilutability generally means the ratio of resin solution to water which it is just possible to maintain at room temperature without the occurrence of turbidity. For example, a water dilutability of 1:1 would mean that a from 30 to 70% solution of the resin which has been cooled to room temperature after condensation may be mixed with an equal volume of water, but not more, before slight turbidity occurs.

The water dilutability may also be a suitable criterion for determining the earliest stage at which the propionamide derivative may be added in order to achieve the benefit of the present invention. The addition of the propionamide derivative just before completion of condensation generally means that the resin should have been condensed to a water dilutability of at least 1:1.8 prior to the addition. For mixing, the resin content of the aqueous resin solution may, if necessary, be adjusted so that after the admixture of from 1 to 20% and in particular from 5 to 10% by weight of a propionamide of the invention there is again obtained a solution having a solids content of from 30 to 70% and preferably from 50 to 60%.

Japanese patent application 33,970/1964 discloses that melamine and formaldehyde may be condensed in aqueous solution in the presence of alkoxypropionamides in aqueous solution to form impregnating resins which are suitable for the manufacture of laminates capable of further shaping, but in the preparation of these resin solutions the modifying agents are added to the reaction mixture of melamine and formaldehyde prior to commencement of the polycondensation reaction. Moreover, the resulting resin solutions are exclusively converted to laminates incorporating non-woven polyamide fabrics as substrate materials.

Resin solutions to which alkoxypropionamides have been added before commencement of polycondensation are suitable for impregnating webs of paper, but the impregnated papers show no preceivable technological advantages in the lamination of wood materials over papers which have been impregnated with unmodified melamine resins.

In particular, the surfaces of laminated wood materials such as chipboard show no appreciable reduction in their tendency to crack when subjected to elevated temperatures, if the melamine resin used for laminating is one to which the alkoxypropionamide has been added prior to polycondensation. This will be demonstrated below with reference to comparative tests.

The resin solutions modified in accordance with the present invention are suitable for impregnating substrate materials such as are used in the manufacture of laminates and particularly for providing the surface layer on wood and wood materials. Particularly suitable substrate materials are absorbent papers.

The manufacture of impregnated substrate materials with the impregnating resin solutions of the invention does not differ from the prior art and it is therefore unnecessary to deal with this detailed treatment in the present specification. Suitable technical references to the preparation of resin-impregnated papers may be found in the pertinent literature.

The resin produced by the process of the invention show such improvement in their flow properties when papers impregnated therewith are processed that it is possible to use lower pressures in the range of from 10 to 20 kg./cm.², which are less likely to harm the substrate being laminated.

Furthermore, the elasticity of surfaces comprising the resins produced by the process of the invention is improved to such an extent that the formation of cracks is reduced greatly.

Laminates prepared using the resin solutions produced by the process of the invention are capable of being shaped.

If aqueous resin solutions prepared from melamine and formaldehyde in a molar ratio of from 1:1.6 to 1:2 in known manner and modified by including by condensation for example 5% of ε-caprolactam and, say, 3% of toluenesulfonamide, based on the solids content of the resin solution, are mixed with from 1 to 20% and preferably from 5 to 10% of said compounds, or if said compounds are added to the reaction mixture of melamine, formaldehyde, caprolactam and toluenesulfonamide just prior to the completion of condensation, there are obtained impregnating resin solutions which are suitable for finishing wood materials, if necessary at elevated temperatures, for example elevated pressing temperatures.

Propionamides containing a dialkylphosphono group and having the following structure:

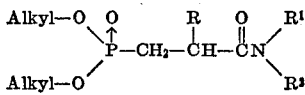

also possess gloss-enhancing properties.

The other properties of melamine resins, in particular their transparency, curing rate and resistance to chemicals and steam, are not impaired by the presence of said compounds.

In the following examples, the quantities and ratios given are by weight unless otherwise stated.

EXAMPLE 1

Preparation of a modified impregnating resin having a molar ratio of melamine to formaldehyde of 1:1.82

A suspension of 126 parts of melamine in 136.5 parts of 40% aqueous formaldehyde solution and 80.5 parts of water is heated at 96° C. and adjusted to pH 8.7 by the addition of aqueous caustic soda. This pH is kept constant by the continuous addition of caustic soda and the reaction mixture is stirred at the stated temperature until the stage is reached at which resin may be precipitated from a sample at 20° C. by the addition of 150% of water to said sample. At this stage, 18 parts of 3-methoxypropionamide are added to the reaction mixture and condensation is continued at 96° C. until the stage is reached at which resin can be precipitated from a sample at 20° C. by adding 100% of water thereto. The reaction mixture is then cooled and the resin solution is adjusted to pH 9.6.

There is obtained a clear and slightly opalescent impregnating resin solution having a solids content of from 53 to 55% (determined by heating a 1 g. sample at 120° C. for 2 hours), the viscosity of the solution at 20° C. being from 35 to 40 centipoise.

EXAMPLE 2

Preparation of a modified impregnating resin having a molar ratio of melamine to formaldehyde of 1:1:82

Exmaple 1 is repeated except that the 18 parts of β-methoxypropionamide are replaced by 18 parts of dimethyl carbamoylethanephosphonate.

The resulting clear resin solution has a viscosity at 20° C. of from 40 to 50 centipoise.

EXAMPLE 3

Lamination of chipboard (a) 50 parts of a melamine powder obtained by condensing 126 parts of melamine with 162 parts of 37% of aqueous formaldehyde solution followed by spray drying are dissolved in 50 parts of water, and 5 parts of 3-methoxypropionamide are added. The resulting 52.5% solution is mixed with sufficient 10% formic acid to cause a sample of the resin (about 1 g.) to gel when heated at 140° C. for 2 minutes in a pressure tube immersed in an oil bath. A decorative paper weighing about 110 g./m.² is impregnated with this resin solution and then dried at from 130° to 150° C. until the stage is reached at which a weight loss of about 5% occurs when drying of a sample is continued at 160° C. for 5 minutes. At this stage, the decorative paper should contain about 130% of its own weight of resin. Chipboard with sanded surface is then sandwiched between papers prepared in the maner described above and the whole is pressed between pressure plates of chromium-plated brass for 10 minutes at 140° C., the applied pressure being 20 kg./cm.². The pressure is maintained while the laminate is cooled to about 50° C., at which stage it is removed from the press.

(b) A second laminate is prepared in a similar manner except that a resin as prepared in Example 1 is used.

(c) For the purposes of comparison, a laminate is prepared in the same manner but using a resin not containing any additive.

In each case, the treated chipboard is tempered for 20 hours at 70° C. in a drying cabinet provided with air-circulating means.

Under these conditions, the well-cured surface produced with the resin solutions contaiinng β-methoxypropionamide remain completely free from cracks, whereas the surfaces of the laminates prepared using papers containing pure melamine resin show a large number of cracks.

EXAMPLE 4

Lamination of chipboard

In each test, 100 parts of the solution of an unmodified resin used in Example 3 and obtained by dissolving a resin powder in water are mixed with 5 parts of dimethyl carbamoylethanephosphonate and processed as stated.

A modified resin as produced in Example 2 by adding the phosphonate just prior to the completion of condensation is used for laminating in a similar manner.

When tested for crack formation, the surfaces in both cases remain completely free from cracks and show distinctly better gloss than surfaces produced with unmodified resins or resins modified with β-methoxypropionamide.

EXAMPLE 5

Lamination of chipboard 100 parts of the solution of an unmodified resin as used in Examples 3 and 4 are mixed with 5 parts of dimethyl N,N - dimethoxymethylcarbamoylethanephosphonate and processed as stated.

The well-cured surfaces show very high gloss and, after subjection to a temperature of 70° C. for 20 hours, only scattered hair-cracks.

EXAMPLE 6

Lamination of chipboard 100 parts of the solution of an unmodified resin as used in Examples 3 to 5 are mixed with 5 parts of 3-allyloxypropionamide and used for laminating chipboard in the manner described in Example 3.

The well-cured surfaces show no cracks when tested for crack formation.

EXAMPLE 7

Lamination of chipboard 100 parts of an aqueous resin solution obtained by condensing 126 parts of melamine with 148 parts of 37% formaldehyde solution and modified by the addition of 10 parts of caprolactam before the commencement of condenstion and 6.7 parts of p-toluenesulfonamide on completion of condensation and containing about 54% of solids are mixed with 5.4 parts of 3-methoxypropionamide and the mixture is adjusted to a gelling time of 90 seconds with 20% formic acid in the manner stated in Example 3. The resulting bath is used for the impregnation of a particularly crack-prone, high-body paper based on α-cellulose and weighing 150 g./m.² in such a manner that the resin pick-up is about 125% of the weight of the paper. Drying and processing is carried out as described in Example 3 except that the pressing time is varied.

| Pressing time at 140° C. and 20 kg./cm.² | Curing effect | Crack formation [1] |
|---|---|---|
| 2 minutes | Slightly cured | No cracks. |
| 6 minutes | Well cured | Do. |
| 10 minutes | Very well cured | Do. |
| 20 minutes | Overcured | Do. |

[1] After testing by tempering in a drying cabinet provided with air-circulating means for 24 hours at 80° C.

A paper impregnated with the same resin but not including β-methoxypropionamide is processed in the same way and, when pressed for only 6 minutes, shows severe cracking when tested for crack formation.

Results of other tests carried out on laminated boards after a pressing time of 10 minutes are as follows:

| Test | Remarks |
|---|---|
| Behavior in steam | Slight loss of gloss. |
| Yellowing at high temperature [1] | Slight yellowing; no blisters. |
| Behavior in contact with hot cooking pots | Slight loss of gloss. |

[1] The flat end of a steel ram heated to 225° C. is pressed against the specimen for 2 minutes under a pressure of 30 kg./cm.², the specimen then being examined for blisters and discoloration.

EXAMPLE 8

Preparation of impregnating resins 126 parts of melamine, 136.5 parts of 40% aqueous formaldehyde solution and 80.5 parts of water are condensed in the manner described in Example 1 to a water compatibility of 1:1.5 at 20° C., whereupon 18 parts of methoxypropionamide are added and condensation is continued to a water-compatibility of 1:1.

There is obtained a clear and slightly opalescent impregnating resin solution having a viscosity at 20° C. of 32 centipoise.

For the purposes of comparison, a resin solution is prepared, the acid amide being added to the reaction mixture before the commencement of condensation.

There is obtained a clear impregnating resin solution having a viscosity of 38 centipoise at 20° C.

EXAMPLE 9

Preparation of impregnating resins

Example 8 is repeated except that the resin is prepared using 18 parts of dimethyl carbamoylethanephosphonate.

For the purposes of comparison, a resin is prepared by adding dimethyl carbamoylethanephosphonate as modifier before the commencement of condensation.

EXAMPLE 10

Lamination of chipboard

The resin solutions prepared in Examples 8 and 9 are adjusted to a gelling time of 90 seconds with formic acid in the manner described in Example 3 and used for impregnating a particularly crack-prone decorative paper weighing 150 g./m.² in such a manner that the resin pick-up is 130% of the weight of the paper at a residual moisture content of 5%. The impregnated papers are used for laminating chipboard in the manner described in Example 3 and the degree of curing and crack formation in the resulting surfaces is tested.

| Resin | Curing effect | Crack formation on tempering at 70° C. for 24 hours |
|---|---|---|
| Example 8 | Very good | Slight hair cracking. |
| Comparison | do | Severe cracking. |
| Example 9 | do | Slight hair cracking. |
| Comparison | do | Severe cracking. |

We claim:

1. A process for the manufacture of impregnating resins based on precondensates of melamine and formaldehyde comprising condensing, in known manner, melamine and formaldehyde in molar ratios of from 1:1.6 to 1:6 with or without conventional additives in minor quantities in aqueous solution and adding, just prior to the completion of condensation or subsequently thereto, from 1 to 20% by weight (based on the solids content of the aqueous solution) of a propionamide derivative which is soluble in the aqueous impregnating resin solution and has the general formula:

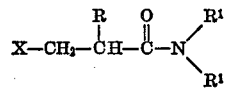

in which X stands for alkoxy, alkenoxy, alkylthio, alkenylthio or dialkylphosphono, the alkyl or alkenyl radicals in X having from 1 to 5 carbon atoms, in which R denotes hydrogen or methyl and in which one or both $R^1$ denote hydrogen, methyl, ethyl, methylol or a methylol ether group with an alcohol of 1 to 5 carbon atoms.

2. A process for the manufacture of impregnating resins as claimed in claim 1, wherein the propionamide derivatives used are those in which one or both of the hydrogens attached to the amide nitrogen are substituted by alkyl groups of 1 or 2 carbon atoms, methylol groups or methylol ether groups.

3. A process as claimed in claim 1 wherein said propionamide derivative is added subsequent to the completion of the condensation reaction.

References Cited

UNITED STATES PATENTS

| 2,937,966 | 5/1960 | Updegraff et al. | 260—32.6 NX |
|---|---|---|---|
| 2,981,704 | 4/1961 | Herbes et al. | 260—67.6 X |

FOREIGN PATENTS

| 2,119 | 1970 | Japan. |
|---|---|---|

MORRIS LIEBMAN, Primary Examiner

SANDRA M. PERSON, Assistant Examiner

U.S. Cl. X.R.

260—30.8 R, 32.6 N, 67.6

UNITED STATES PATENT OFFICE
CERTIFICATE OF CORRECTION

Patent No. 3,808,167          Dated April 30, 1974

Inventor(s) Harro Petersen, B. Magerkurth, O. Froede, L. Lelgemann

It is certified that error appears in the above-identified patent and that said Letters Patent are hereby corrected as shown below:

Col. 1, line 61, delete "1:16" and insert --1:1.6--;

Col. 2, line 21, delete "dipropylphosphono" and insert --3-dipropylphosphono--;

Col. 2, line 49, delete "toluensulforamides" and insert --toluenesulforamides--;

Col. 4, line 67, delete "surface" and insert --surfaces--;

Col. 5, line 53, delete "p-toluenesulfonamide" and insert --o-p-toluenesulfonamide--.

Signed and Sealed this sixteenth Day of September 1975

[SEAL]

Attest:

RUTH C. MASON
Attesting Officer

C. MARSHALL DANN
Commissioner of Patents and Trademarks